(12) United States Patent
Xue et al.

(10) Patent No.: US 12,421,820 B2
(45) Date of Patent: Sep. 23, 2025

(54) SEALED CORING DEVICE FOR UNDERGROUND COALBED

(71) Applicant: ANHUI UNIVERSITY OF SCIENCE AND TECHNOLOGY, Anhui (CN)

(72) Inventors: Sheng Xue, Huainan (CN); Lefan Wang, Huainan (CN); Xiaoliang Zheng, Huainan (CN); Ping Liu, Huainan (CN); Chen Shen, Huainan (CN); Gang Jin, Huainan (CN); Weibo Liu, Huainan (CN); Sihang Zhang, Huainan (CN); Jingyi Zhou, Huainan (CN)

(73) Assignee: ANHUI UNIVERSITY OF SCIENCE AND TECHNOLOGY, Anhui (CN)

( * ) Notice: Subject to any disclaimer, the term of this patent is extended or adjusted under 35 U.S.C. 154(b) by 0 days.

(21) Appl. No.: 18/548,370

(22) PCT Filed: May 17, 2023

(86) PCT No.: PCT/CN2023/094831
§ 371 (c)(1),
(2) Date: Aug. 30, 2023

(87) PCT Pub. No.: WO2024/093198
PCT Pub. Date: May 10, 2024

(65) Prior Publication Data
US 2025/0012159 A1 Jan. 9, 2025

(30) Foreign Application Priority Data
Nov. 1, 2022 (CN) .......................... 202211357571.1

(51) Int. Cl.
*E21B 25/10* (2006.01)
*G01N 1/08* (2006.01)

(52) U.S. Cl.
CPC ................ *E21B 25/10* (2013.01); *G01N 1/08* (2013.01)

(58) Field of Classification Search
CPC ............ E21B 25/10; E21B 25/00; G01N 1/08
See application file for complete search history.

(56) References Cited

U.S. PATENT DOCUMENTS

| 4,009,618 A | 3/1977 | Chatham |
| 4,576,234 A * | 3/1986 | Upchurch ........... E21B 49/0813 137/614.21 |

(Continued)

FOREIGN PATENT DOCUMENTS

| CN | 105672925 A | 6/2016 |
| CN | 211737089 U | 10/2020 |

(Continued)

OTHER PUBLICATIONS

PCT International Search Report; China; PCT/CN2023/094831; dated Aug. 9, 2023; 3 pages.

Primary Examiner — Nicole Coy
Assistant Examiner — Nicholas D Wlodarski
(74) Attorney, Agent, or Firm — Emerson, Thomson & Bennett, LLC; Daniel A. Thomson

(57) ABSTRACT

The sealed coring device for an underground coalbed comprises a rib drill pipe assembly, a tail bearing pack, a motor cylinder assembly and a sampling cylinder assembly. The rib drill pipe assembly consists of a rib drill pipe, a tail drill pipe joint and a head drill pipe joint. The tail bearing pack is mounted in the tail drill pipe joint and configured for protecting an internal structure from relatively rotating during drilling of the rib drill pipe, so that the stability of the sampling cylinder is ensured. The motor cylinder assembly (Continued)

is mounted in the rib drill pipe and configured for providing power for action of a center shaft in the sampling cylinder assembly.

10 Claims, 7 Drawing Sheets

(56) References Cited

U.S. PATENT DOCUMENTS

| | | | |
|---|---|---|---|
| 9,506,307 B2* | 11/2016 | Kinsella | E21B 25/02 |
| 11,131,147 B1* | 9/2021 | Berger | E21B 10/02 |
| 2021/0310323 A1* | 10/2021 | Tydelski | E21B 25/18 |
| 2022/0120153 A1* | 4/2022 | Lybbert | E21B 25/02 |
| 2022/0170335 A1* | 6/2022 | Xie | E21B 10/02 |
| 2022/0186576 A1* | 6/2022 | Gao | E21B 10/02 |

FOREIGN PATENT DOCUMENTS

| | | |
|---|---|---|
| CN | 211784419 U | 10/2020 |
| CN | 113622849 A | 11/2021 |
| CN | 115541299 A | 12/2022 |
| CN | 115597912 A | 1/2023 |

* cited by examiner

SEALED CORING DEVICE FOR UNDERGROUND COALBED

CROSS-REFERENCE TO RELATED APPLICATION

This application is a national stage application of International Patent Application No. PCT/CN2023/094831, filed on May 17, 2023, which claims priority of the Chinese Patent Application No. 202211357571.1, filed on Nov. 1, 2022, both of which are incorporated by references in their entities.

TECHNICAL FIELD

The present disclosure belongs to the technical field of coalmine tunnel coring, and particularly relates to a sealed coring device for an underground coalbed.

BACKGROUND

China is limited in green coal resources, and the implementation of accurate and intelligent coal mining is the only way for green mining in the future. The geological guarantee technology system is an important foundation. The prevention and control of coal mine methane disaster is the key and difficult points of mine safety production, and accurate measurement of coalbed methane content and pressure is the core. At present, open or ball valve closed coring technology is widely configured in sampling methane coalbeds or coal mines, and is low in coring efficiency, easy for methane loss and low in measurement timeliness. The accuracy and effectiveness of methane content and pressure data are difficult to ensure, and coalbed risk characteristics cannot be effectively evaluated to guide engineering practice.

China is not only a big coal producer, but also a big coal consumer. Coal is an important basic energy and raw material in China. Coalbed methane content and coalbed methane pressure are the main indicators of regional prediction and regional effect test of prominent dangers in coalbeds. Coalbed methane content is usually measured by surface coalbed methane content determination, geological exploration methane content determination, underground coalbed drilling coring and other methods. Due to the differences in test conditions and test methods of coalbed methane content, the above coalbed methane content test results are often quite different, low in accuracy, general in estimated loss and limited in guiding significance for coal mining.

For coalbed tunnel coring, the patent specification with the publication number of CN204646157U discloses a coalbed methane rope coring device. According to the device, a corer is lifted up and put down by using a rope, and at the same time, it is necessary to introduce compressed air into the coring device to drive the coring device to act. The patent specification with the publication number of CN107905752A discloses a corer, and the corer is lifted up and put down by using a rope. At the same time, the coring device is driven to act by means of water pressure. In order to further realize pressure-maintaining coring of the coalbed, the patent specification with the publication number of CN201811862U discloses a coal sample sampler. Pressure-maintaining coring of samples is carried out by means of viscous liquid and vacuum devices. There are fluid media in the device, resulting in certain pollution to coalbed cores and influence on the determination of water content and other parameters. The patent specification with the publication number of CN104453759B discloses a sealed coring device for testing coalbed methane and gas content in rock formations in surface boreholes. According to the device, a core cutting sealed ball valve is opened and started by means of a pushing effect of the samples. The structure is relatively complicated. Different coalbeds are cut by different accessories, and the operation is uneasy, so that the work efficiency is low:

Therefore, it is required to provide a sealed coring device for an underground coalbed.

SUMMARY

The present disclosure aims to overcome the problems existing in the prior art, and provides a sealed coring device for an underground coalbed.

In order to achieve the technical purpose and the technical effect, the present disclosure is realized by the following technical scheme:

The present disclosure provides a sealed coring device for an underground coalbed, including:
  a rib drill pipe assembly comprising and only comprising a rib drill pipe, a tail drill pipe joint and a head drill pipe joint; joint mounting bases for mounting the tail drill pipe joint and the head drill pipe joint are respectively arranged at two ends of the rid drill pipe;
  a tail bearing pack mounted in the tail drill pipe joint and configured for protecting an internal structure from relatively rotating during drilling of the rib drill pipe, thus ensuring stability of the sampling cylinder;
  a motor cylinder assembly mounted in the rib drill pipe and configured for providing power for action of the center shaft in the sampling cylinder assembly; and
  a sampling cylinder assembly mounted in the rib drill pipe and comprising a center shaft, a tail cover plate, a tail sealing ring, a tail revolving door, a sampling cylinder, a head revolving door, a head sealing ring, a head cover plate and a back nut retainer ring, wherein a hollow shaft sleeve for mounting the center shaft is arranged in the sampling cylinder, a head sampling port is formed on a head end of the sampling cylinder, a tail sampling port is formed on a tail end of the sampling cylinder, and the tail cover plate, the tail revolving door, the head revolving door, the head cover plate and the back nut retainer ring are mounted on the center shaft.

In some embodiments, in the sealed coring device for an underground coalbed, the tail bearing pack comprises a ventilation bearing seat, a front nut retainer ring, a bearing support and a tapered roller bearing pack, the bearing support is mounted in the ventilation bearing seat via a clamping frame, the tapered roller bearing pack is supported by the bearing support, and the front nut retainer ring for preventing axial displacement of the tapered roller bearing pack is mounted outside a tail end of the tapered roller bearing pack.

In some embodiments, in the sealed coring device for an underground coalbed, the motor cylinder assembly comprises a motor cylinder, a battery, a direct current motor and a motor cylinder cover plate, the battery and the direct current motor are mounted in an inner cavity of the motor cylinder, the motor cylinder cover plate is mounted at an opening of the inner cavity of the motor cylinder, and an output shaft of the direct current motor penetrates through the motor cylinder cover plate and is fixed with an end of the center shaft via a hollow coupling.

In some embodiments, in the sealed coring device for an underground coalbed, a tail end of the motor cylinder is in threaded connection with the clamping frame, a hollow threading shaft extending into the tapered roller bearing pack is arranged at a center of the tail end of the motor cylinder, a supporting retainer ring for preventing axial displacement of the hollow threading shaft is mounted on the hollow threading shaft, and an inner cavity of the hollow threading shaft serves as a channel for passing through of wires and air.

In some embodiments, in the sealed coring device for an underground coalbed, the tail cover plate is at an outer side thereof in threaded connection with a ventilation supporting tube, a support bearing matched with the ventilation supporting tube is mounted between inner walls of the rib drill pipe, one end of the hollow coupling is fixed with the motor cylinder cover plate, a dustproof deep groove ball bearing is mounted between the other end of the hollow coupling and the hollow shaft sleeve of the sampling cylinder, the hollow coupling is fixed with the center shaft via a pin penetrating through the hollow coupling, and the tail cover plate, the motor cylinder cover plate, the ventilation supporting tube, the hollow coupling and the dustproof deep groove ball bearing form a ventilation connecting assembly together.

In some embodiments, in the sealed coring device for an underground coalbed, the tail cover plate is arranged on an outer side of the tail revolving door, the tail sealing ring is mounted between the tail cover plate and the tail revolving door, the head cover plate is arranged on an outer side of the head revolving door, and the head sealing ring is mounted between the head cover plate and the head revolving door.

In some embodiments, in the sealed coring device for an underground coalbed, the tail revolving door and the head revolving door are rotated at corresponding angles under three working conditions, both the tail revolving door and the head revolving door at initial assembly positions are at 0-degree positions, an observation angle is in a direction from the tail end of the sampling cylinder to the head end of the sampling cylinder where a counterclockwise direction is a positive direction.

At the initial positions, the angles of circle centers of single notches of the tail revolving door are respectively 90° and 135°, and an angle of the head sampling port of the sampling cylinder is 45° to 225°.

When sampling is started, the center shaft is controlled to rotate by 45°, so that the tail revolving door is in a closed state and the head revolving door is in a fully open state.

When sampling is finished, the center shaft is controlled to rotate again by 180° with a difference of 225° from an initial angle, so that both the head revolving door and the tail revolving door are in a sealed state.

In some embodiments, in the sealed coring device for an underground coalbed, the head drill pipe joint is provided with a coal sample cutting mechanism.

In some embodiments, in the sealed coring device for an underground coalbed, the tail revolving door and the head revolving door are made of a copper-based graphite self-lubricating material.

In some embodiments, in the sealed coring device for an underground coalbed, a control chip integrated with a remote control module is mounted in the motor cylinder: a patch type temperature sensor, a humidity sensor and a pressure sensor are mounted on an inner wall of the sampling cylinder: the battery, the temperature sensor, the humidity sensor, the pressure sensor and the direct current motor are all connected with the control chip, and the control chip performs wireless communication with a remote back-end via the remote control module.

The present disclosure has the following beneficial effects.

Firstly, the present disclosure can realize long-distance fixed-point sampling of coal samples, and can carry out drilling and sampling simultaneously without replacing drill bit or drill pipe, so that the sampling time is greatly shortened. The sampling cylinder and the drill pipe are of a double-layer structure. When sampling is completed, the drill pipe may be left in a drill hole, and the sampling cylinder may be lifted out separately, and when sampling is carried out next time, a new sampling cylinder is put into the drill pipe, so that coal samples with different depths can be collected and detected for many times, so that the time for coal samples to analyze methane in the drill hole is reduced, and the sampling effect is better.

Secondly, through the built-in sensor of the sampling cylinder and the transmission wire attached to the outside of the drill pipe, long-distance remote monitoring of underground coalbed methane is realized, and the possibility that coal samples leak methane is reduced. Multi-layer sealing arrangement and a holding effect of the bearing pack on a sampling main body ensure that air pressure in the sampling cylinder is kept in a constant state, and the air impermeability of the device is ensured, so that the sampling result is more accurate. In addition, one part meets multiple design requirements, and is convenient to assemble and easy to disassemble and convenient for subsequent debugging and maintenance.

Certainly, it is not necessary to achieve all the above advantages at the same time for any product to implement the present disclosure.

BRIEF DESCRIPTION OF THE DRAWINGS

To describe the technical schemes in the embodiments of the present discourse more clearly, the following briefly describes the attached figures required for describing the embodiments. Apparently, the attached figures in the following descriptions show merely some embodiments of the present disclosure, and a person of ordinary skill in the art may derive other drawings from these attached figures without creative efforts.

REFERENCE SIGNS

1, tail drill pipe joint; 2, ventilation bearing seat; 3, front nut retainer ring; 4, bearing support; 5, tapered roller bearing pack; 6, hollow threading shaft; 7, supporting retainer ring; 8, motor cylinder; 9, battery; 10, direct current motor; 11, motor cylinder cover plate; 12, hollow coupling; 13, center shaft; 14, support bearing; 15, dustproof deep groove ball bearing; 16, tail cover plate; 17, tail sealing ring; 18, tail revolving door; 19, sampling cylinder; 20, head revolving door; 21, head sealing ring; 22, head cover plate; 23, back nut retainer ring; 24, joint mounting base; 25, head sampling port; 26, tail sampling port; 27, head drill pipe joint; and 28, rib drill pipe; 29, tail bearing pack; and 30, ventilation supporting tube.

DETAILED DESCRIPTION OF THE EMBODIMENTS

The following clearly and completely describes the technical scheme in the present embodiments of the present disclosure with reference to the attached figures in the present embodiments of the present disclosure. Apparently, the described embodiments are merely a part rather than all of the present embodiments of the present disclosure. All other embodiments obtained by a person of ordinary skill in the art based on the embodiments of the present disclosure without creative efforts shall fall within the protection scope of the present disclosure.

Figure 1:
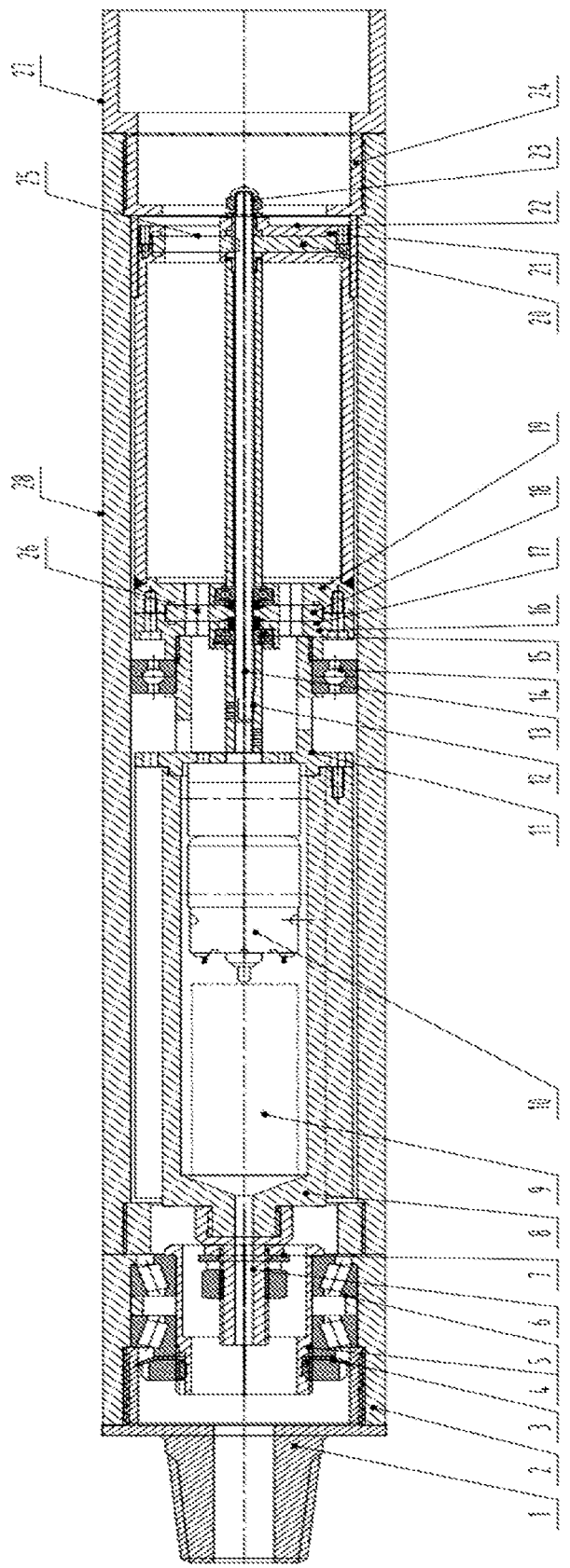
FIG. 1 is an integral structural schematic diagram of the present disclosure.
Figure 2:
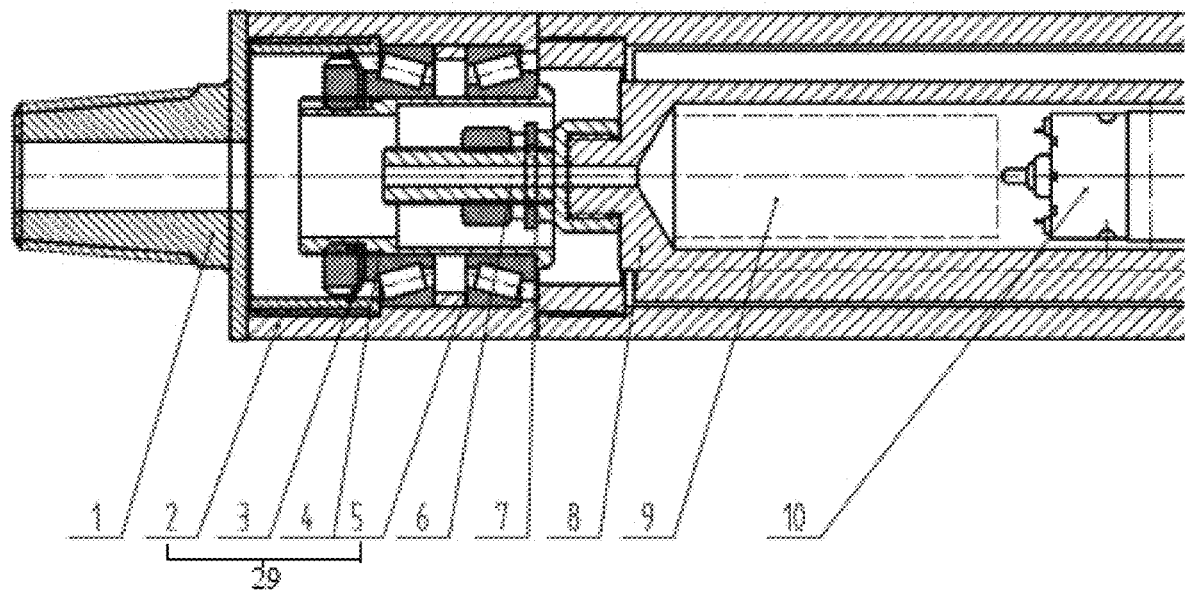
FIG. 2 is an enlarged schematic diagram of a left section structure in FIG. 1.
Figure 3:
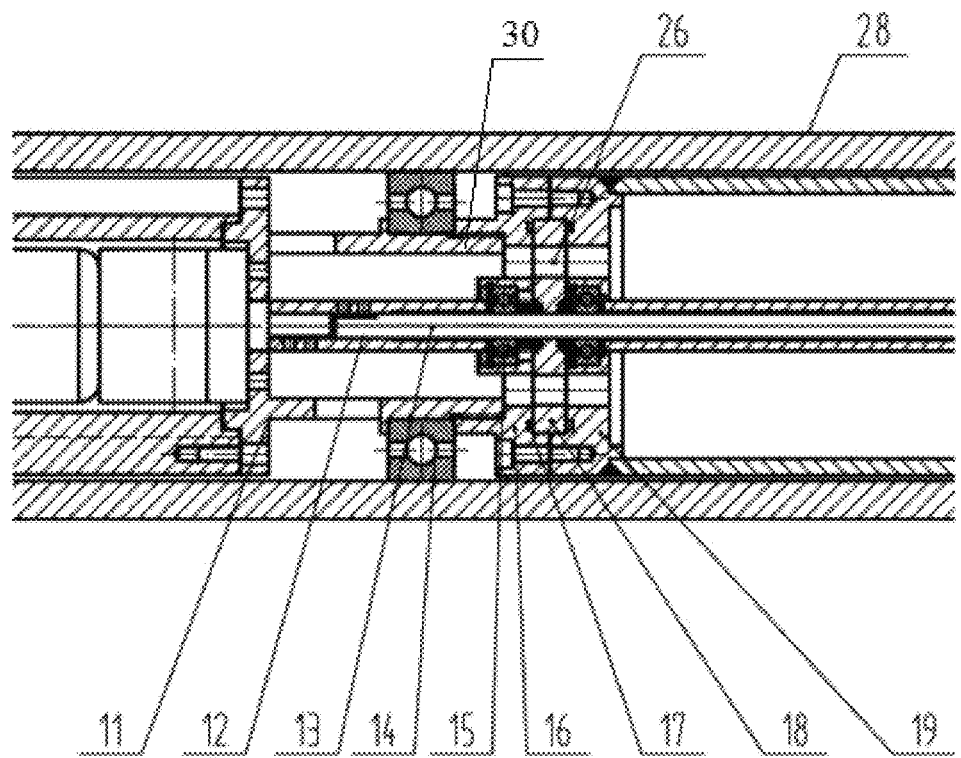
FIG. 3 is an enlarged schematic diagram of a middle section structure in FIG. 1.
Figure 4:
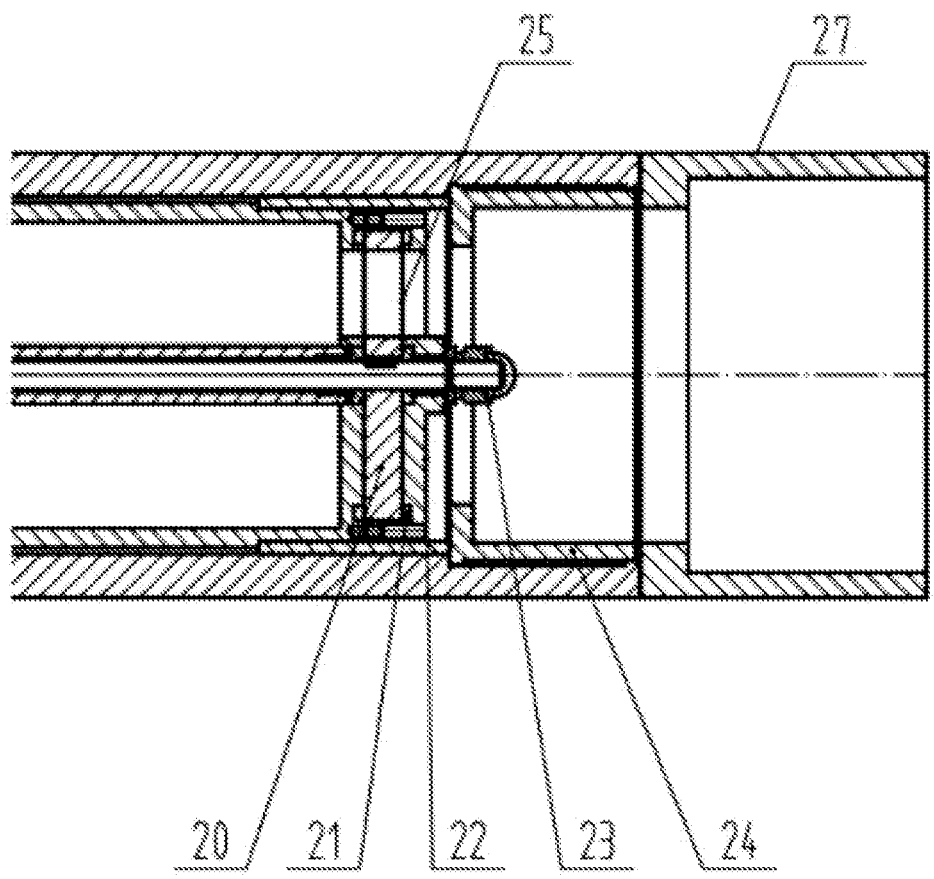
FIG. 4 is an enlarged schematic diagram of a right section structure in FIG. 1.
Figure 5:
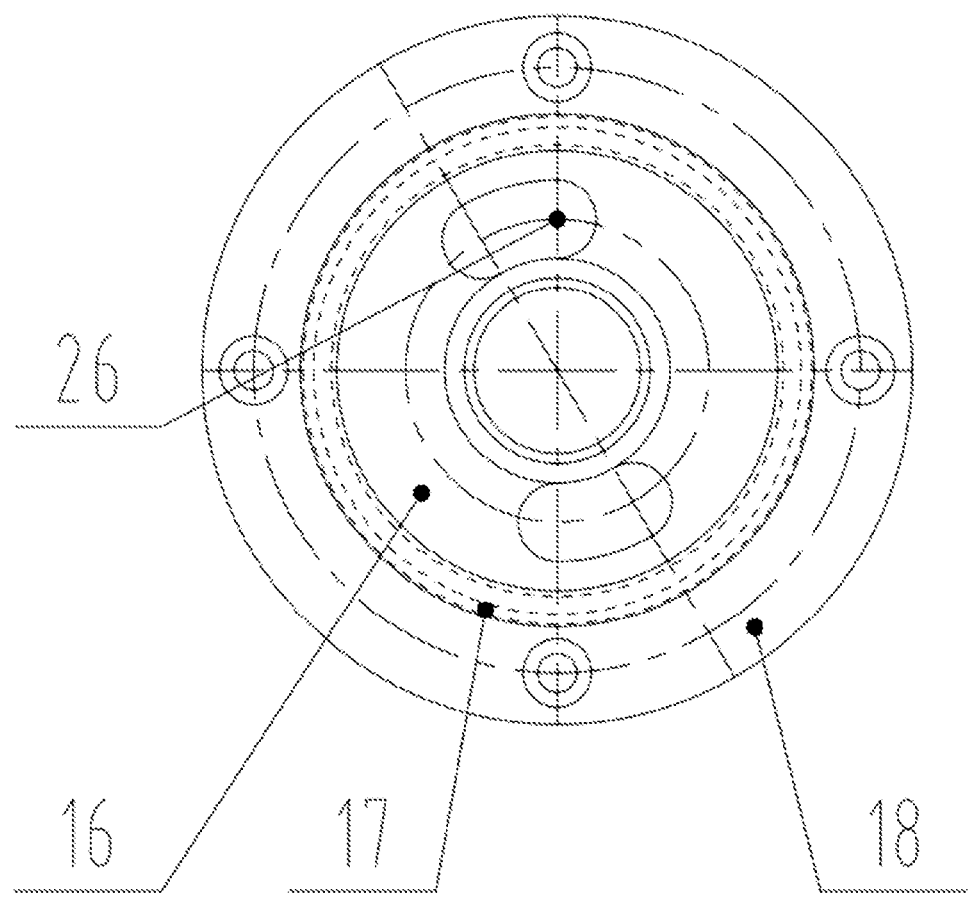
FIG. 5 is a schematic diagram of a tail ventilation of a sampling cylinder in the present disclosure.
Figure 6:
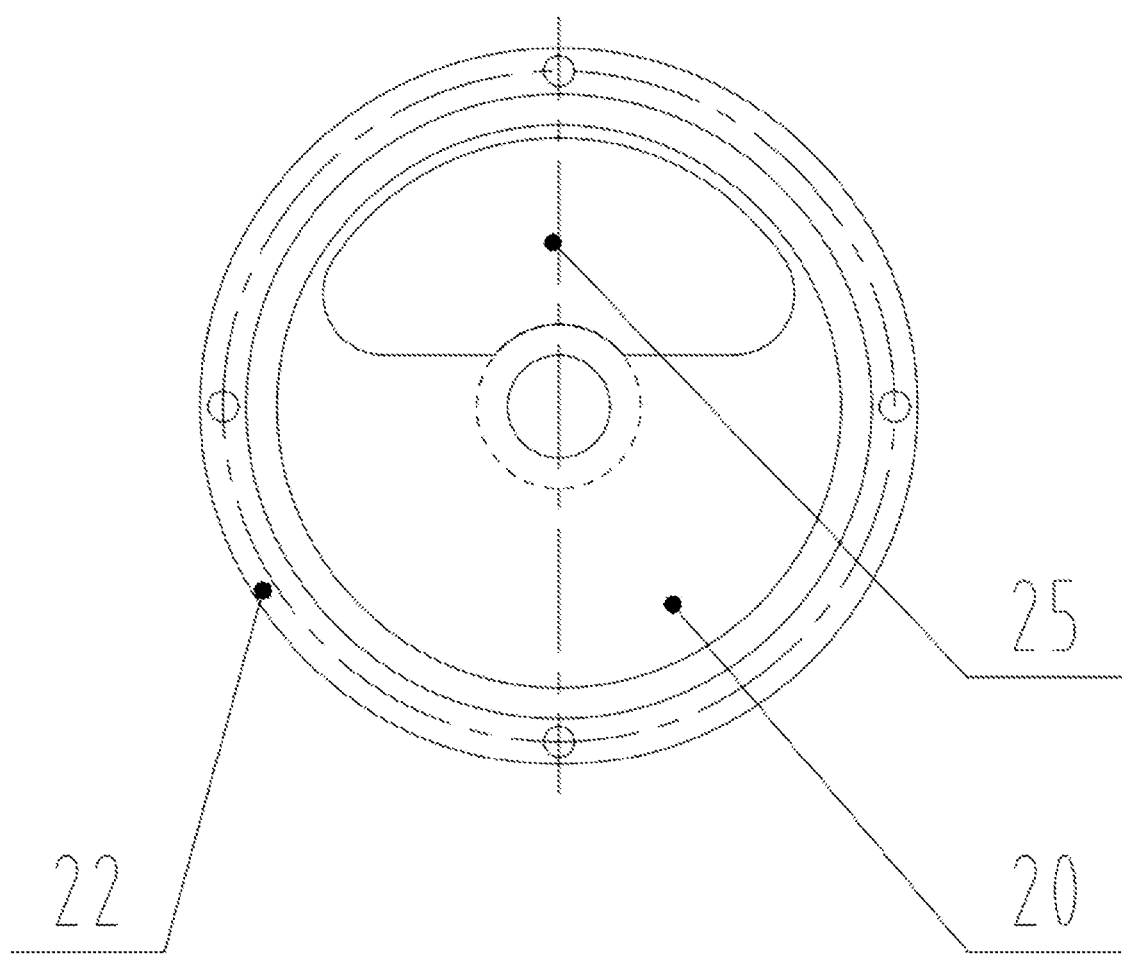
FIG. 6 is a schematic diagram of a head ventilation of the sampling cylinder in the present disclosure.
Figure 7:
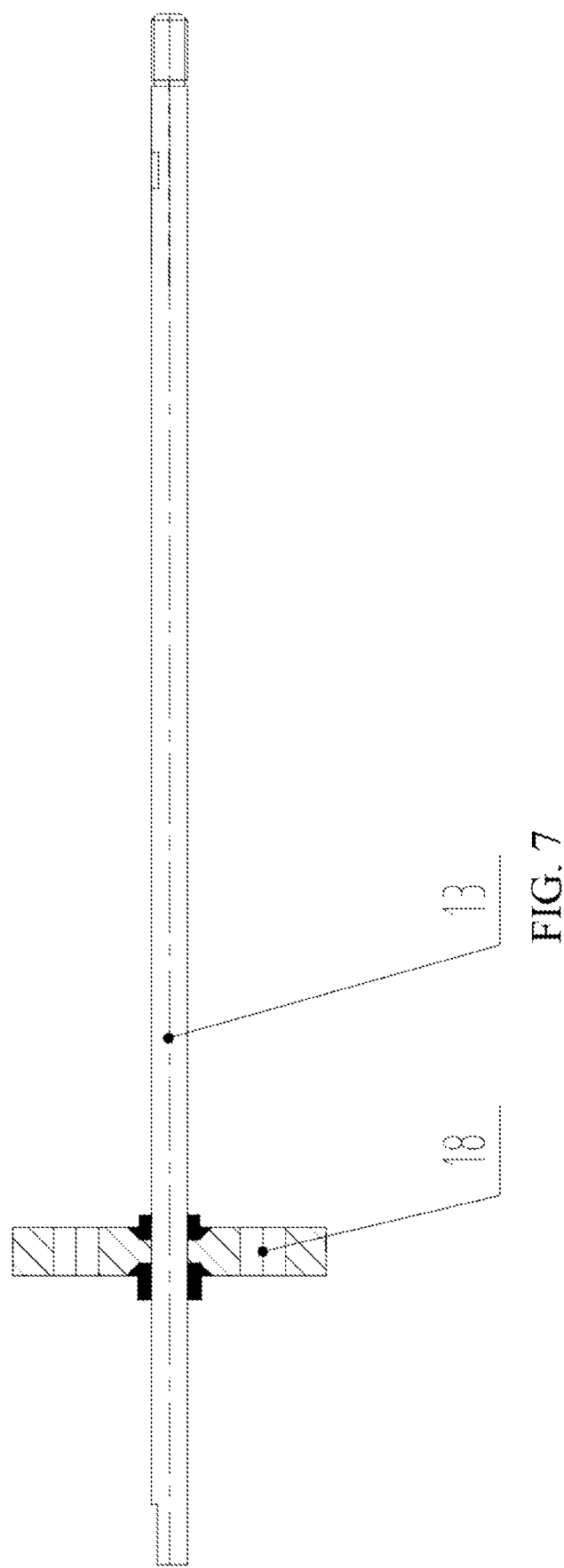
FIG. 7 is a schematic diagram of a separated tail sealing door of the sampling cylinder and a separated center shaft in the present disclosure.
Figure 8:
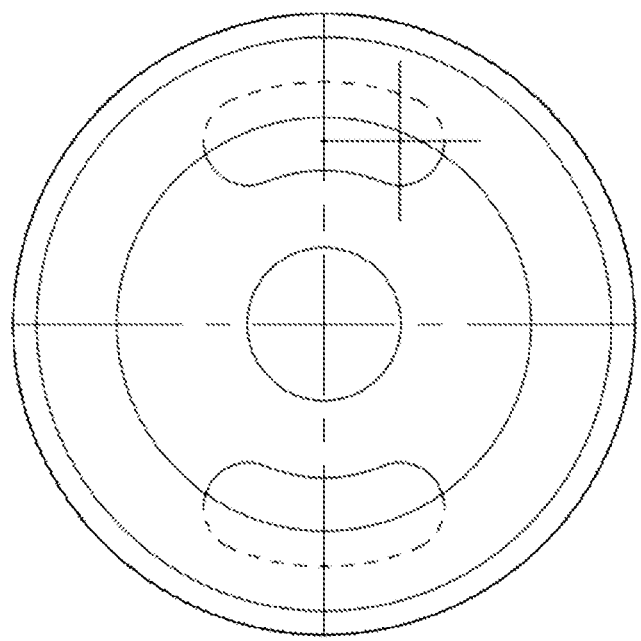
FIG. 8 is a ventilation schematic diagram of a bearing support at the tail of a drill pipe in the present disclosure.
Figure 9:
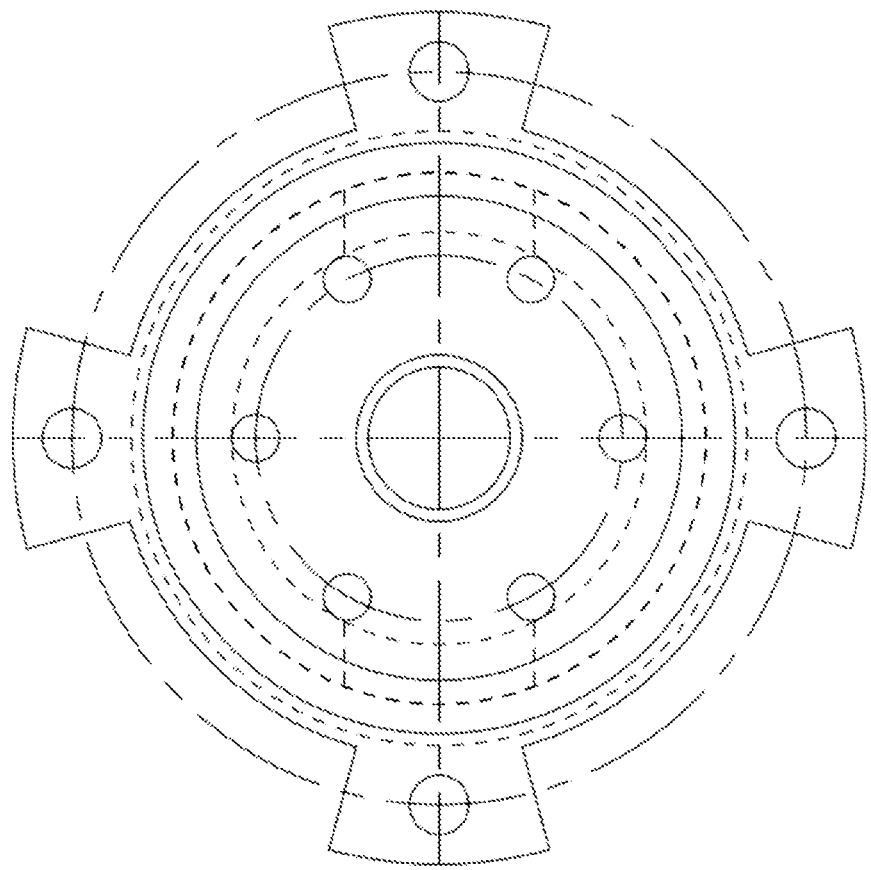
FIG. 9 is a ventilation opening schematic diagram of a motor cylinder in the present disclosure.

As shown in FIG. 1 to FIG. 9, the embodiment provides a sealed coring device for an underground coalbed. The sealed coring device for an underground coalbed includes a rib drill pipe assembly, a tail bearing pack 29, a motor cylinder assembly and a sampling cylinder assembly. The rib drill pipe assembly includes a rib drill pipe 28, a tail drill pipe joint 1 and a head drill pipe connector 27. Joint mounting bases 24 convenient to mount the drill pipe joints are respectively arranged at two ends of the rid drill pipe 28. The tail bearing pack is mounted in the tail drill pipe joint 1, and the tail drill pipe joint 1 is configured for protecting an internal structure from relatively rotating during drilling of the rib drill pipe 28, so that the stability of the sampling cylinder 19 is ensured. The motor cylinder assembly is mounted in the rib drill pipe 28 and configured for providing power for action of a center shaft 13 in the sampling cylinder assembly.

In the embodiment, the sampling cylinder assembly is mounted in the rib drill pipe 28 and includes a center shaft 13, a tail cover plate 16, a tail sealing ring 17, a tail revolving door 18, a sampling cylinder 19, a head revolving door 20, a head sealing ring 21, a head cover plate 22 and a back nut retainer ring 23. A hollow shaft sleeve convenient to mount the center shaft 13 is arranged in the sampling cylinder 19. A head sampling port 25 is formed on a head end of the sampling cylinder 19, and a tail sampling port 26 is formed on a tail end of the sampling cylinder 19. The tail cover plate 16, the tail revolving door 18, the head revolving door 20, the head cover plate 22 and the back nut retainer ring 23 are mounted on the center shaft 13.

In the embodiment, the tail bearing pack 29 includes a ventilation bearing seat 2, a front nut retainer ring 3, a bearing support 4 and a tapered roller bearing pack 5. The bearing support 4 is mounted in the ventilation bearing seat 2 via a clamping frame. The tapered roller bearing pack 5 is supported by the bearing support 4. The front nut retainer ring 3 for preventing axial displacement of the tapered roller bearing pack is mounted outside a tail end of the tapered roller bearing pack 5.

In the embodiment, the motor cylinder assembly includes a motor cylinder 8, a battery 9, a direct current motor 10 and a motor cylinder cover plate 11. The battery 9 and the direct current motor 10 are mounted in an inner cavity of the motor cylinder 8. The motor cylinder cover plate 11 is mounted at an opening of the inner cavity of the motor cylinder 8. An output shaft of the direct current motor 10 penetrates through the motor cylinder cover plate 11 and is fixed with an end of the center shaft 13 via a hollow coupling 12.

In the embodiment, a tail end of the motor cylinder 8 is in threaded connection with the clamping frame. A hollow threading shaft 6 extending into the tapered roller bearing pack 5 is arranged at the center of the tail end of the motor cylinder 8. A supporting retainer ring 7 for preventing axial displacement of the hollow threading shaft 6 is mounted on the hollow threading shaft 6. An inner cavity of the hollow threading shaft 6 serves as a channel for passing through of wires and air.

In the embodiment, the tail cover plate 16 is at an outer side thereof in threaded connection with a ventilation supporting tube 30. A support bearing 14 matched with the ventilation supporting tube 30 is mounted between inner walls of the rib drill pipe 28. One end of the hollow coupling 12 is fixed with the motor cylinder cover plate 11, and a dustproof deep groove ball bearing 15 is mounted between the other end of the hollow coupling 11 and the hollow shaft sleeve of the sampling cylinder 19. The hollow coupling 12 is fixed with the center shaft 13 via a pin penetrating via the hollow coupling 12. The tail cover plate 16, the motor cylinder cover plate 11, the ventilation supporting tube, hollow coupling 12 and the dustproof deep groove ball bearing 15 form a ventilation connecting assembly together.

In the embodiment, the tail cover plate 16 is arranged on an outer side of the tail revolving door 18. The tail sealing ring 17 is mounted between the tail cover plate 16 and the tail revolving door 18. The head cover plate 22 is arranged on an outer side of the head revolving door 20. The head sealing ring 21 is mounted between the head cover plate 22 and the head revolving door 20.

In the embodiment, the tail revolving door 18 and the head revolving door 20 need to rotate at corresponding angles under three working conditions. Both doors at initial assembly positions are at 0-degree positions. The observation angle is in the direction from the tail of the sampling cylinder 19 to the head of the sampling cylinder 19. A counterclockwise direction is a positive direction At the initial positions, the angles of circle centers of single notches of the tail revolving door 18 are respectively 90° and 135°, and the angle of the head sampling port 25 of the sampling cylinder 19 is 45° to 225°.

When sampling is started, the center shaft 13 is controlled to rotate by 45°, so that the tail revolving door 18 is in a closed state and the head revolving door 20 is in a fully open state.

When sampling is finished, the center shaft 13 is controlled to rotate again by 180° with a difference of 225° from an initial angle, so that both the head revolving door and the tail revolving door are in a sealed state.

In the embodiment, the head drill pipe joint 27 is provided with a coal sample cutting mechanism.

In the embodiment, the tail revolving door 18 and the head revolving door 20 are made of a copper-based graphite self-lubricating material.

In the embodiment, a control chip integrated with a remote control module is mounted in the motor cylinder 8. A patch type temperature sensor, a humidity sensor and a pressure sensor are mounted on an inner wall of the sampling cylinder 19. The battery 9, the temperature sensor, the humidity sensor, the pressure sensor and the direct current motor 10 are all connected with the control chip. The control chip performs wireless communication with a remote back-end via the integrated remote control module.

The specific operation flow of the present disclosure is as follows.

When the motor cylinder assembly is assembled, the battery 9 and related circuits are firstly put into the motor cylinder 8, a charging wire passes through the interior of a hollow pipeline of the clamping frame out of the motor cylinder 8, and the direct current motor 10 is fixed on a ventilation support frame, and then the ventilation support frame is mounted. The direct current motor 10 and the battery 9 are completely mounted in the motor cylinder 8, and the clamping frame is threadedly mounted on the tail of the motor cylinder 8. When the sampling cylinder assembly is assembled, the dustproof deep groove ball bearing 15 is put in the tail of the sampling cylinder 19 and an O-shaped sealing ring is plugged in the tail of the sampling cylinder 19, then a welded part of the tail revolving door 18 and the center shaft 13 is integrally inserted into the hollow shaft sleeve of the sampling cylinder 19, and then a deep groove ball bearing device matched with the tail of the sampling cylinder 19 is assembled in the tail cover plate 16. At the same time, an O-shaped sealing ring is also mounted in a groove in a surface, in contact with the revolving door, of the cover plate, and then the tail cover plate 16 of the sampling cylinder is in threaded connection to the sampling cylinder 19 via bolts. The tail revolving door 18 is tightly plugged between the sampling cylinder 19 and the tail cover plate 16. A copper sleeve and an O-shaped sealing ring are plugged in the head of the sampling cylinder 19, a flat key is plugged in the exposed center shaft 13, the head revolving door 20 is sleeves the outside of the key, then the head cover plate 22 is connected to the sampling cylinder 19 via bolts, and the head revolving door 20 is tightly plugged between the sampling cylinder 19 and the head cover plate 22. Then, the threaded part of the center shaft exposed outside the head cover plate 22 is covered with a cap nut and a washer, and a copper sleeve is mounted outside the sampling cylinder 19. A deep groove ball bearing sleeves the ventilation support frame as a support and plays an anti-rotation role at the same time, and then the tail of the sampling cylinder 19 is in threaded connection with the head of the ventilation support frame. Then, the connecting part between the drill pipes is in threaded connection with the drill pipes, the bearing pack is mounted in the connecting part, then the joint abuts against the bearing pack, then the motor cylinder 8 and the sampling cylinder 19 are integrally mounted into the drill pipes from the heads of the drill pipes, and then drill bit is screwed on the head of the drill pipe.

The built-in battery provides power for the direct current motor 10, so that the ventilation state and the sealing state of the sampling cylinder 19 are changed by opening and closing the revolving doors on both sides of the head and tail of the sampling cylinder 19. The revolving doors on both sides need to rotate at corresponding angles under three working conditions, both doors at initial assembly positions are at 0-degree positions, the observation angle is in the direction from the tail of the sampling cylinder to the head of the sampling cylinder, and the counterclockwise rotation is the positive rotation direction. At the initial positions, the angles of circle centers of single notches of the tail revolving door are respectively 90° and 135°, the angle of a semicircular opening of the head sampling cylinder is 45° to 225°. When sampling is started, the motor is controlled to rotate by 45°, so that the tail revolving door 18 is in a closed state and the head revolving door 20 is in a fully open state. When sampling is finished, the motor is controlled to rotate again by 180° with a difference of 225° from an initial angle, so that both revolving doors at the head and the tail are in a sealed state. The sealing of the revolving doors is ensured by the labyrinth sealing revolving doors made of the self-lubricating graphite copper material matched with the rubber O-shaped sealing rings buried in clamping grooves of the revolving doors. The bearing pack is matched with the copper sleeve, so that the whole structure cannot rotate when the drill pipes rotate, and the stability of the internal structure can be ensured. Through the built-in sensor of the sampling cylinder 19 and the transmission wire attached to the outside of the drill pipe, long-distance remote monitoring of underground coalbed methane is realized.

The preferred embodiments of the present disclosure disclosed above are merely to help illustrate the present disclosure. The preferred embodiments neither fully recite all the details nor limit the present disclosure to the specific embodiments only. Obviously, many modifications and variations are possible according to the contents of the specification. These embodiments are chosen and described in detail in the specification in order to better explain the principles of the present disclosure and the practical application thereof, so that those skilled in the art understand and utilize the present disclosure preferably. The present disclosure is limited only by the claims and full scope and equivalents thereof.

What is claimed is:

1. A sealed coring device for an underground coalbed, comprising:
    a rib drill pipe assembly comprising a rib drill pipe, a tail drill pipe joint and a head drill pipe joint; joint mounting bases configured for mounting the tail drill pipe joint and the head drill pipe joint are respectively arranged at two ends of the rib drill pipe;
    a sampling cylinder assembly mounted in the rib drill pipe and comprising a center shaft, a tail cover plate, a tail sealing ring, a tail revolving door, a sampling cylinder, a head revolving door, a head sealing ring, a head cover plate and a back nut retainer ring, wherein a hollow shaft sleeve for mounting the center shaft is arranged in the sampling cylinder, a head sampling port is formed on a head end of the sampling cylinder, a tail sampling port is formed on a tail end of the sampling cylinder, and the tail cover plate, the tail revolving door, the head revolving door, the head cover plate and the back nut retainer ring are mounted on the center shaft;
    a tail bearing pack mounted in the tail drill pipe joint and configured for protecting an internal structure from relatively rotating during drilling of the rib drill pipe, thus ensuring stability of the sampling cylinder; and
    a motor cylinder assembly mounted in the rib drill pipe and configured for providing power for driving the center shaft in the sampling cylinder assembly.

2. The sealed coring device for an underground coalbed according to claim 1, wherein the tail bearing pack comprises a ventilation bearing seat, a front nut retainer ring, a bearing support and a tapered roller bearing pack, the bearing support is mounted in the ventilation bearing seat via a clamping frame, the tapered roller bearing pack is supported by the bearing support, and the front nut retainer ring for preventing axial displacement of the tapered roller bearing pack is mounted outside a tail end of the tapered roller bearing pack.

3. The sealed coring device for an underground coalbed according to claim 2, wherein the motor cylinder assembly comprises a motor cylinder, a battery, a direct current motor and a motor cylinder cover plate, the battery and the direct current motor are mounted in an inner cavity of the motor cylinder, the motor cylinder cover plate is mounted at an opening of the inner cavity of the motor cylinder, and an output shaft of the direct current motor penetrates through the motor cylinder cover plate and is fixed with an end of the center shaft via a hollow coupling.

4. The sealed coring device for an underground coalbed according to claim 3, wherein a tail end of the motor cylinder is in threaded connection with a clamping frame, a hollow threading shaft extending into the tapered roller bearing pack is arranged at a center of the tail end of the motor cylinder, a supporting retainer ring for preventing axial displacement of the hollow threading shaft is mounted on the hollow threading shaft, and an inner cavity of the hollow threading shaft serves as a channel for passing through of wires and air.

5. The sealed coring device for an underground coalbed according to claim 4, wherein the tail cover plate is in threaded connection with a ventilation supporting tube at an outer side of the tail cover plate, a support bearing matched with the ventilation supporting tube is mounted at inner walls of the rib drill pipe, one end of the hollow coupling is fixed with the motor cylinder cover plate, a dustproof deep groove ball bearing is mounted between an other end of the hollow coupling and the hollow shaft sleeve of the sampling cylinder, the hollow coupling is fixed with the center shaft via a pin penetrating through the hollow coupling; and the tail cover plate, the motor cylinder cover plate, the ventilation supporting tube, the hollow coupling and the dustproof deep groove ball bearing form a ventilation connecting assembly together.

6. The sealed coring device for an underground coalbed according to claim 5, wherein the tail cover plate is arranged on an outer side of the tail revolving door, the tail sealing ring is mounted between the tail cover plate and the tail revolving door, the head cover plate is arranged on an outer side of the head revolving door, and the head sealing ring is mounted between the head cover plate and the head revolving door.

7. The sealed coring device for an underground coalbed according to claim 6, wherein the tail revolving door and the head revolving door are rotated at corresponding angles under three working conditions, both the tail revolving door and the head revolving door at initial assembly positions are at 0-degree positions, an observation angle is in a direction from the tail end of the sampling cylinder to the head end of the sampling cylinder where a counterclockwise direction is a positive direction;

at initial positions, angles of circle centers of single notches of the tail revolving door are respectively 90° and 135°, and an angle of the head sampling port of the sampling cylinder is 45° to 225°;

when sampling is started, the center shaft is controlled to rotate by 45°, so that the tail revolving door is in a closed state and the head revolving door is in a fully open state; and when sampling is finished, the center shaft is controlled to rotate again by 180° with a difference of 225° from an initial angle, so that both the head revolving door and the tail revolving door are in a sealed state.

8. The sealed coring device for an underground coalbed according to claim 7, wherein the head drill pipe joint is provided with a coal sample cutting mechanism.

9. The sealed coring device for an underground coalbed according to claim 8, wherein the tail revolving door and the head revolving door are made of a copper-based graphite self-lubricating material.

10. The sealed coring device for an underground coalbed according to claim 9, wherein a control chip integrated with a remote control module is mounted in the motor cylinder; a patch type temperature sensor, a humidity sensor and a pressure sensor are mounted on an inner wall of the sampling cylinder; the battery, the temperature sensor, the humidity sensor, the pressure sensor and the direct current motor are all connected with the control chip, and the control chip performs wireless communication with a remote back-end via the remote control module.

\* \* \* \* \*